March 15, 1955     J. G. OGDEN     2,704,161

VEHICLE MOUNTED COLLECTION APPARATUS

Filed Feb. 26, 1953     2 Sheets-Sheet 1

INVENTOR.
JOHN G. OGDEN
BY *Susser, Smith & Harding*
ATTORNEYS

March 15, 1955   J. G. OGDEN   2,704,161
VEHICLE MOUNTED COLLECTION APPARATUS
Filed Feb. 26, 1953   2 Sheets-Sheet 2

INVENTOR.
JOHN G. OGDEN
ATTORNEYS

United States Patent Office 2,704,161
Patented Mar. 15, 1955

2,704,161

VEHICLE MOUNTED COLLECTION APPARATUS

John G. Ogden, Philadelphia, Pa.

Application February 26, 1953, Serial No. 339,084

7 Claims. (Cl. 214—83.32)

This invention relates to collection apparatus and, more particularly, to a container of a type adapted to be mounted on a collection vehicle of a type adapted to be driven through city streets wherein material may be dumped into the container and positioned therein by conveyor means.

Collection vehicles of numerous types are well known. These vehicles have, however, various undesirable limitations. For example, in many of the collection vehicles it is necessary for an operator to walk to the rear of the vehicle in order to deposit material therein and then to return to the forward end of the vehicle in order to enter the cab of the vehicle to drive it.

It is an object of this invention to provide a collection vehicle in which material may be deposited into a container thereon at the forward end of the container and at a location adjacent to the cab of the vehicle.

A further disadvantage found in many of the collection vehicles now in use is that the vehicles provide a limited space for storage of collected material in respect to the total space available for storage. This is due to the fact that frequently considerable amount of space is occupied by conveyors or similar mechanism for moving collected material from the portion of the container into which the material is dumped by an operator to the portion of the container where the material is stored during collection.

It is a further object of this invention to provide a material collection vehicle in which a major portion of the space within the vehicle is available for the storage of material during collection.

A still further disadvantage in many of the collection vehicles now known is that the vehicle may be unloaded only with considerable difficulty. In some, it is necessary that the entire material container be removed from the vehicle and in others it is necessary that the material be pulled out or otherwise removed through access panels.

It is a further object of the present invention to provide a vehicle from which the accumulated material may be discharged simply by the removal of a tailgate at the rear end of the vehicle and operation of a conveyor therein.

It is a further object of the invention to provide a material collection vehicle in which the material may be deposited into the forward end of a container thereon and the container provided internally with a conveyor which will carry the material toward the rear end of the container and compact the material therein until such time as it is desired to unload the container whereupon, by the removal of a rear panel on the container, the same conveyor which carried the material to the rear of the container during the collection thereof is employed to discharge the load of material from the container.

These and other objects of the invention will become apparent from the following description when read in conjunction with the accompanying drawings, in which.

Figure 1:
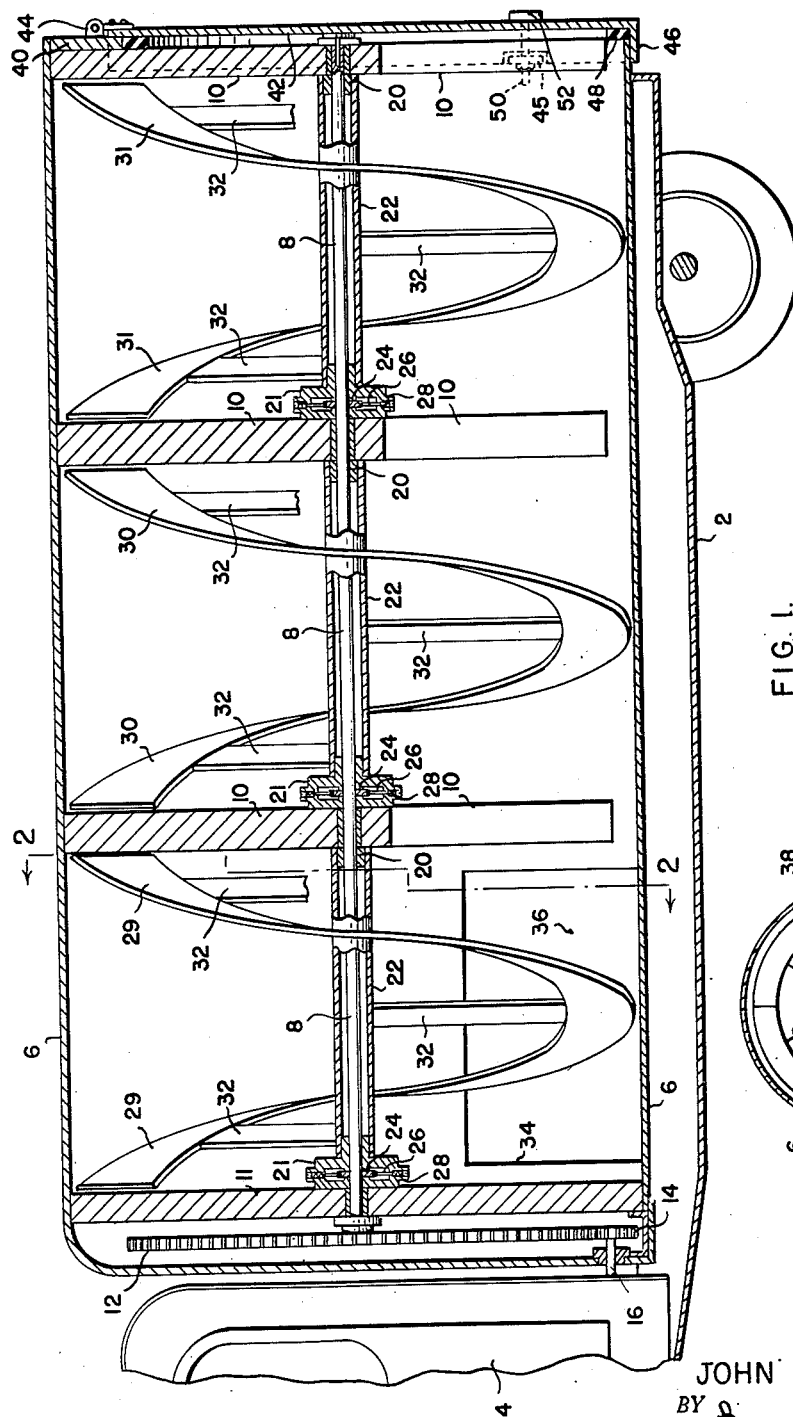
Figure 1 is a longitudinal section of a collection vehicle incorporating a container constructed in accordance with the present invention.
Figure 2:
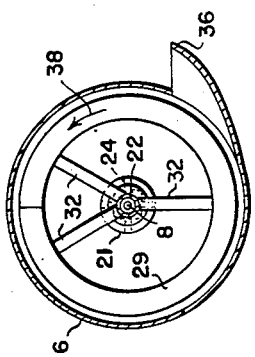
Figure 2 is a transverse section through the container taken on the trace 2—2 of Figure 1.

Referring to Figures 1 and 2 there is shown a truck frame 2 supporting a driver's cab 4 and a container 6. The container is of cylindrical form and extends from the rear of the truck cab to the extreme rear end of the truck.

A longitudinally extending drive shaft 8 passes through the center of the container 6 and is supported therein by Y-shaped support frames 10 one of which is positioned at the rear end of the container and others located intermediate the ends of the container. The forward end of the drive shaft 8 is supported by a plate 11 extending transversely of the container 6 and sealing off the forward end thereof. The drive shaft 8 extends forwardly through the transverse plate 11 and has mounted on the left end thereof, as viewed in Figure 1, a driving gear 12. The driving gear is driven by a pinion gear 14 which is attached to a shaft 16 which is in turn driven by suitable power take-off connected to the truck transmission in a manner well known in the art.

Positioned between the forwardmost Y-shaped support frame 10 and the transverse plate 11 is a tubular member 22 which is positioned concentrically with respect to the drive shaft 8 and held in that position and rotatably mounted on the shaft 8 by a bearing 20 and a clutch housing 21. Longitudinal motion of the tubular member 22 is prevented by engagement of the gearing 20 with the adjacent Y-shaped frame 10 and by engagement of the clutch housing 21 adjacent to the transverse plate 11. The tubular member 22 is rigidly attached to the clutch housing 21. A cam 24 positioned within the clutch housing 21 is rigidly affixed to the drive shaft 8. Cam followers 26 are carried by the clutch housing 21 and are urged into engagement with the cam 24 by means of springs 28. Thus the clutch housing 21 is driven by the drive shaft 8 through the interengagement of the cam 24 and cam followers 26. This type of clutch is fully described in my Patent No. 2,501,648, issued March 21, 1950.

A screw type conveyor blade 29 is supported from the tubular member 22 by means of support posts 32. While the screw conveyor is shown as a blade type conveyor, it will be evident that the width of the blade may be varied and the width of the blade may be extended inwardly to the tubular member 22 thus providing a solid type screw conveyor if desired.

Between each of the adjacent rearward Y-shaped supporting members there is provided a clutch driven tubular member 22 supporting a conveyor screw identical to that previously described, the intermediate tubular member mounting a conveyor screw 30 and the rearward tubular member mounting a conveyor screw 31.

The lower portion of the container 6 adjacent to the forward end thereof is provided with a cutout 34 on the curb side of the truck. Extending outwardly from the cutout 34 is a receiver or trough-like structure 36 into which an operator may dump the material being collected by the vehicle. The screw conveyor 29 is so formed that upon rotation of the conveyor in a counterclockwise direction, as viewed from the rear of the vehicle and is shown in Figure 2, the conveyor blades will move upwardly past the cut-away portion of the container and to the rear of the container. Thus material which is deposited into the receiver 36 is carried away from the receiver opening and to the rear of the container. It will be evident that, if desired, a similar opening may be provided on the opposite side of the container so that material may be deposited into the container from either side thereof. It should be noted that on the opposite side of the container the action of the conveyor would be to carry the material downwardly and backwardly and thus the material admitted would be carried away from the opening.

Material which has been deposited into the container at the forward end thereof will be carried by the conveyors to the rear end of the container. The material accumulating at the rear end of the container will become compacted therein until such time as the load imposed on the rearwardmost conveyor 31 exceeds the driving capacity of its associated clutch whereupon the cam followers 26 of this clutch will compress their associated springs and permit their associated cam 24 to rotate without driving the clutch housing 21 or the screw 31.

Continued operation of the forward screw 29 and the intermediate screw 30 will, of course, take place and additional material being deposited into the container will be carried toward the rear end thereof until such time as the intermediate screw 30 becomes so heavily loaded that it is beyond the driving capacity of its associated clutch whereupon both the rearwardmost screw 31 and the intermediate screw 30 will be halted and only the forward conveyor screw 29 will operate. This condition will exist until the container is so filled with material that the operator has difficulty adding further material through the trough 36 or until rotation of the forwardmost conveyor 39 is arrested.

At the rear end of the container 6 there is provided across the upper portion thereof a fixed plate 40 which supports a hinged tailgate 42 on hinges 44. The tailgate has a forwardly extending flange 46 which surrounds the major portion of the rear end of the container and a gasket 48 is provided to seal the tailgate 42 against the rear end of the container 6. This gasket is provided in the event that garbage or other fluid or semifluid materials are handled by the truck and it is desired to avoid leakage and drippage of these materials during the collection thereof. The tailgate 42 is retained in a closed position by suitable bolts 50 which are hinged to pads 52 attached to the tailgate 42 and are in engagement with suitable plates 54 attached to the exterior of the container 6. Numerous fastening devices of this type are well known to the art.

When the container has been fully loaded and the truck driven to the location where the load is to be discharged, it is merely necessary for an operator to release the various tailgate securing bolts 50 and engage the mechanism for driving the drive shaft 8 whereupon, the load having been removed from the conveyor screws 29—31, the conveyor screws will commence to rotate and the entire load will be carried thereby out of the rear of the container. After the container has been unloaded, the tailgate 42 may conveniently be restored to a closed and bolted position and the truck may then be promptly driven away.

It will be evident that the number of conveyor sections, the length of each section and the pitch of the conveyors as well as the depth of the conveyor blades may be selected in consideration of the proportions of the container and in order to provide the most efficient handling of any particular type of material. The overrunning clutch structure provides not only for disconnect of the successive conveyor sections when they are overloaded as a result of an accumulation of material thereon but also provides for a safety disconnect in the event that material becomes jammed between, for example, the ends of the conveyor blades and the supporting structure. The clearance between the ends of the conveyor blades and the support members 10 and the clearance between the outermost edges of the blades and the wall of the container 6 may be selected in consideration of the type of material handled.

Figures 3, 4:
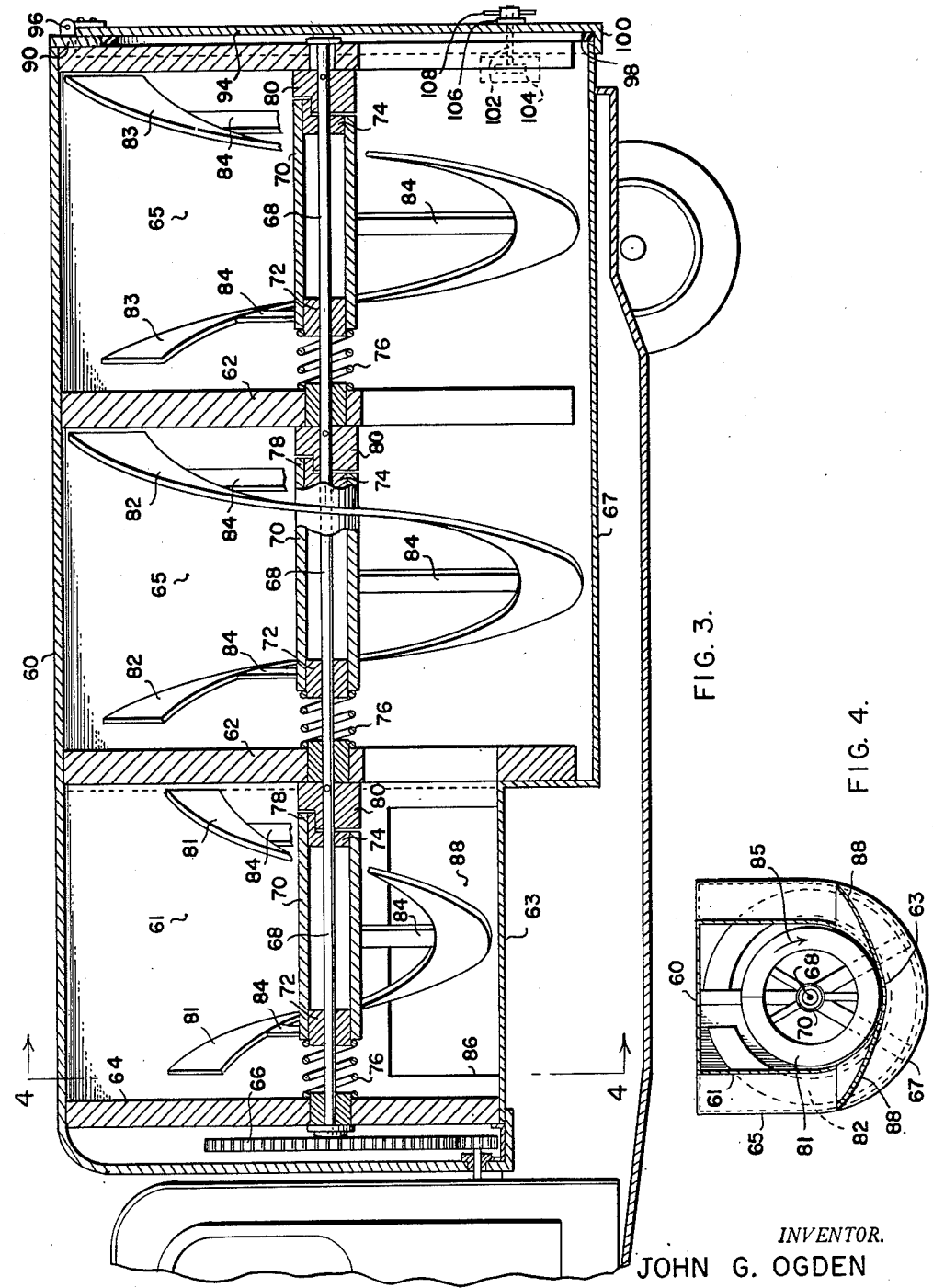
Figure 3 is a longitudinal section taken through a collection vehicle incorporating an alternate form of the present invention.
Figure 4 is a transverse section through the container shown in Figure 3 taken on the trace 4—4 thereof.

Referring to Figures 3 and 4 there is shown an alternate form of the invention including a container having a flat top 60. The rearward portion of the container has a curved bottom section 67 and flat vertically extending side walls 65 joining the top section 60 with the curved bottom section 67. The forward portion of the container is smaller than the rearward portion thereof and includes a curved lower section 63 and flat side walls 61 extending between the curved portion 63 and the flat top 60.

A transversely extending plate 64 closes off the forward end of the forward portion of the container. The rearward portion of the container has Y-shaped supporting members 62 positioned therein immediately adjacent to the forward and rearward ends thereof and intermediate of the ends. A longitudinally extending drive shaft 68 is supported by the members 62 and the plate 64 and is driven by a gear 66 attached to the forward end thereof externally of the plate 64 in a manner identical to the drive involved in the arrangement described in connection with Figure 1.

Between the transversely extending plate 64 and the forwardmost Y-shaped support frame 62 a tubular member 70 is positioned concentrically with respect to shaft 68 and rotatably mounted thereon by means of a bushing 72 at the forward end thereof and a bushing 74 at the rearward end thereof. These two bushings are freely mounted on the drive shaft 68. A spring 76 acting between the plate 64 and the forward end of the tubular member 70 urges the tubular member toward the rear of the container. The rearward ends of the tubular member 70 and the bushing 74 are provided with a rearwardly extending portion 78 adapted to engage a mating recess in a driving member 80 which is attached to the drive shaft 68. A conveyor screw 81 is mounted on the tubular member 70 in the reduced diameter forward portion of the conveyor by means of support bars 84. It will be evident that when the shaft 68 is driven the member 80 attached thereto will drive the tubular member 70 which in turn will drive the conveyor screw 82 in a clockwise direction as viewed from the front of the truck as shown in Figure 4 by the arrow 85.

The spaces between the adjacent Y-shaped member 62 extending to the rear of the truck are also provided with similar tubular members 70, driving members 80 and conveyors 82 and 83 respectively.

In this form of the invention the forward portion of the container is provided with cutout portions 86 on each side thereof adjacent to the forward end thereof. A receiver or trough 88 extends outwardly from the cutouts 86 on each side of the container providing a receiver for the deposition of material which is being collected. The conveyor 81 will carry the material dumped into the receivers to the rear of the container in a manner identical to that described in connection with the apparatus shown in Figure 1.

It will be evident from viewing Figure 4 that this construction permits the use of a rearward container portion having maximum possible diameter while the receivers 88 do not extend beyond this maximum permissible diameter.

As each of the conveyor sections becomes overloaded by the collection of material in its portion of the container, the reaction of the load upon the conveyor will cause the conveyor to move to the left compressing its associated spring 76 and disengaging the extension 78 of the tubular member 70 from the recess in its associated driving member 80 whereupon the motion of the conveyor will be arrested and the drive shaft is free to rotate. As the load accumulates in each of the rearward sections of the container, the conveyor of that section will cease to rotate and eventually, when the container becomes fully loaded, only the forward section of the conveyor will be rotating and eventually this too may be disengaged.

In this form of the invention the container, as shown in Figure 4, has a flat top 60. It will be evident that this flat top construction may also be provided in conjunction with the conveyor drive mechanism shown in the apparatus of Figure 1 and that a cylindrical container may be employed in the apparatus of Figure 3. The flat top has an advantage in that it provides additional space in the truck for the storage of material and also provides a place where large objects which cannot be placed inside the truck may be stored as they are collected. For example, in a rubbish collecting truck, articles such as Christmas trees, old mattresses and other bulky pieces must be collected and quite obviously could not be placed inside of a collecting vehicle such as the one described herein.

A transverse plate 90 is provided across the top portion of the rear end of the container and supports a tailgate 94 which is hinged thereto by hinges 96. The tailgate is provided with a forwardly extending flange 100 which engages the sides of the truck body. A gasket 98 is provided between the tailgate 94 and the container in order to prevent the drainage of liquids from the container. The tailgate is held in position by means of a bolt 102 pivotally attached to a plate 104 attached to the side of the truck. The bolt 102 extends between a clevis plate 106 attached to the tailgate and a wing nut 108 is adapted to be threaded onto the bolt and engage the clevis plate 106.

In this form of the invention when the container has become fully loaded and each of the conveyor screws has been moved to its left hand position and its motion arrested, opening of the tailgate 94 will permit the load to expand out of the rear of the truck releasing the reaction load upon the conveyor screws and permitting the springs 76 to expand reengaging the tubular members 70 with their respective driving members 80 whereupon rotation of the conveyors will drive the load out of the containers. In this form of the invention, similar to that described in connection with Figure 1, upon discharge of the load from the truck, it is merely necessary to bolt the tailgate into its closed position and drive the truck away.

The truck disclosed herein may be used to collect garbage, ordinary rubbish as is collected in municipal districts, and any other type of material which may be suitably handled by a screw type conveyor. It will be evident that the pitch of the conveyor screw blades and the widths of the blades may be varied depending upon the type of material to be handled and that the support members 10 and 62 and the support members 32 and 84 may be variously formed as to minimize the resistance afforded thereby to the passage of collected material being carried by the conveyors.

This collection vehicle has the advantage of being relatively low and yet of having its entire internal space utilized for the storage of collected material. It has the advantage of permitting loading at the forward end thereof which reduces the number of steps which an operator must take, and has the further advantage of being very simply unloaded from the rear end thereof by the release of the tailgate as has been described. Thus both loading and unloading are performed in an extremely simple manner and there is provided the maximum storage space possible within a body of given external dimensions.

While the invention has been disclosed as being embodied in a collecting vehicle, it will be evident that the essence of the invention is the provision of a collection apparatus in which material to be stored therein is admitted into one end thereof and carried to the other end thereof by a succession of conveyor blades which may be successively disconnected from their driving means automatically upon the disposition of a predetermined value of load thereon. The invention further contemplates unloading of the container by opening the rear end thereof opposite from the inlet end and thereby relieving the load upon the conveyors and permitting them to act to discharge the material contained in the container.

It will be evident that various modifications may be made in the details of the structure of the disclosed embodiments of the invention. For example, the form of the invention shown in Figure 1 may be provided with a reduced diameter forward portion and similar to that disclosed in connection with Figure 3. Alternatively, a continuous drive shaft need not be employed and the forward portion of the container may be of reduced diameter and have a bottom portion in alignment with the bottom portion of the rearward portion of the container and individually driven drive shafts provided to drive the forwardmost conveyor and the rearward conveyors. These and other modifications may be made to the invention without departing from the scope of the invention as set forth in the following claims.

What is claimed is:

1. A collection vehicle including means for driving the vehicle, a container mounted on the vehicle, means adjacent to the forward end of said container through which material may be introduced into said container, openable closure means for the rear end of said container, successive conveyors extending longitudinally through said container for conveying material therethrough, means coupled to the vehicle drive for driving said conveyors, and means for independently connecting each of said conveyors to said driving means, for disconnecting each of said connecting means when the load imposed on the conveyor driven thereby by accumulated material exceeds a predetermined value as a result of material accumulating in said container and for reconnecting each of said connecting means when the load imposed on the conveyors by the accumulated material is relieved by the opening of said openable closure member.

2. A collection vehicle including means for driving the vehicle, a container mounted on the vehicle, means adjacent to the forward end of said container through which material may be introduced into said container, openable closure means for the rear end of said container, successive screw conveyors each having outside diameters substantially equal to the inside diameter of the portion of the container adjacent thereto and extending longitudinally through said container for conveying material therethrough, means extending longitudinally axially of said container and coupled to the vehicle drive for driving said conveyor, and means for independently connecting each of said conveyors to said driving means, for disconnecting each of said connecting means when the load imposed on the conveyor driven thereby by accumulated material exceeds a predetermined value as a result of material accumulating in said container and for reconnecting each of said connecting means when the load imposed on the conveyors by the accumulated material is relieved by the opening of said openable closure member.

3. A collection vehicle including means for driving the vehicle, a container mounted on the vehicle, means adjacent to the forward end of said container through which material may be introduced into said container, openable closure means for the rear end of said container, successive conveyors extending longitudinally through said container for conveying material therethrough, means for driving said conveyors, and means for independently connecting each of said conveyors to said driving means, for disconnecting each of said connecting means when the load imposed on the conveyor driven thereby by accumulated material exceeds a predetermined value as a result of material accumulating in said container and for reconnecting each of said connecting means when the load imposed on the conveyors by the accumulated material is relieved by the opening of said openable closure member.

4. A collection vehicle including means for driving a vehicle, an elongated container mounted on the vehicle, means through which material may be introduced into said container, openable closure means for one end of said elongated container, successive conveyors extending therethrough, means for driving said conveyors, and means for independently connecting each of said conveyors to said driving means, for disconnecting each of said connecting means when the load imposed on the conveyor driven thereby by accumulated material exceeds a predetermined value as a result of material accumulating in said container and for reconnecting each of said connecting means when the load imposed on the conveyors by the accumulated material is relieved by the opening of said openable closure member.

5. Collection apparatus comprising an extended container, an aperture adjacent to one end of said container through which material may be introduced into said container, openable closure means for the other end of said container, successive screw conveyors having substantially the diameter of the container adjacent thereto extending longitudinally through said container for conveying the introduced material therethrough, means including a shaft extending longitudinally through said container for driving said conveyors, and means for independently connecting each of said conveyors to said driving shaft, for disconnecting each of said connecting means when the load imposed on the conveyor driven thereby by accumulated material exceeds a predetermined value as a result of material accumulating in said container and for reconnecting each of said connecting means when the load imposed on the conveyors by the accumulated material is relieved by the opening of said openable closure means.

6. A collection vehicle including a container mounted on a vehicle, conveyor means extending longitudinally through said container for conveying material therethrough, means for driving said conveyor means, means in the region of the forwardmost portion of the conveyor means providing for the introduction of material into said container and openable closure means in the region of the rearwardmost portion of the conveyor providing for the discharge of material from said container by the conveyor means, the horizontally transverse dimension of the container in the region of said forwardmost portion of the conveyor means being less than the horizontally transverse dimension of the remainder of the container.

7. A collection vehicle including a container mounted on a vehicle, successive conveyors extending longitudinally through said container for conveying material therethrough, means for driving said successive conveyors, means in the region of the forwardmost conveyor providing for the introduction of material into said container, and openable closure means in the region of the rearwardmost conveyor providing for discharge of material from said container by the rearwardmost conveyor, the horizontally transverse dimension of the container in the region of said forwardmost conveyor being less than the horizontally transverse dimension of the remainder of the container.

References Cited in the file of this patent

UNITED STATES PATENTS

| | | |
|---|---|---|
| 1,341,239 | Mason | May 25, 1920 |
| 1,415,024 | Eiermann | May 9, 1922 |
| 1,961,587 | Hulley et al. | June 5, 1934 |
| 2,231,145 | Watanabe | Feb. 11, 1941 |
| 2,488,965 | Dear | Nov. 22, 1949 |
| 2,493,591 | Newton | Jan. 3, 1950 |
| 2,501,648 | Ogden | Mar. 21, 1950 |
| 2,615,587 | Beyer et al. | Oct. 28, 1952 |

FOREIGN PATENTS

| | | |
|---|---|---|
| 804,399 | France | Aug. 3, 1936 |
| 580,706 | Great Britain | Sept. 17, 1946 |